US007806575B2

(12) United States Patent
Willwohl et al.

(10) Patent No.: US 7,806,575 B2
(45) Date of Patent: Oct. 5, 2010

(54) LED LIGHTING MODULE

(75) Inventors: Harald Willwohl, Aachen (DE); Gerard Elders, Eindhoven (NL); Jan Reniers, Nuenen (NL); Piet Van Der Wielen, Grave (NL); Ralph Hubert Peters, Maastricht (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 234 days.

(21) Appl. No.: 12/067,845

(22) PCT Filed: Sep. 12, 2006

(86) PCT No.: PCT/IB2006/053229

§ 371 (c)(1),
(2), (4) Date: Mar. 24, 2008

(87) PCT Pub. No.: WO2007/034361

PCT Pub. Date: Mar. 29, 2007

(65) Prior Publication Data

US 2008/0253127 A1 Oct. 16, 2008

(30) Foreign Application Priority Data

Sep. 22, 2005 (EP) ................................ 05108767

(51) Int. Cl.
*B60Q 1/00* (2006.01)
*F21V 7/04* (2006.01)

(52) U.S. Cl. ....................... 362/547; 362/549; 362/548; 362/545; 362/264; 362/265; 362/267

(58) Field of Classification Search ................. 362/545, 362/546–549, 218, 221, 264, 265, 267, 373
See application file for complete search history.

(56) References Cited

U.S. PATENT DOCUMENTS

| | | | | |
|---|---|---|---|---|
| 6,461,024 | B1 * | 10/2002 | Becker et al. | 362/331 |
| 6,552,658 | B1 | 4/2003 | Roller et al. | |
| 6,637,921 | B2 | 10/2003 | Coushaine | |
| 6,682,211 | B2 | 1/2004 | English et al. | |
| 6,819,506 | B1 | 11/2004 | Taylor et al. | |
| 7,521,872 | B2 * | 4/2009 | Bruning | 315/158 |
| 2004/0037087 | A1 * | 2/2004 | Desai | 362/541 |
| 2004/0066142 | A1 | 4/2004 | Stimac et al. | |
| 2005/0110649 | A1 | 5/2005 | Fredericks et al. | |
| 2008/0117647 | A1 * | 5/2008 | Behr et al. | 362/547 |

FOREIGN PATENT DOCUMENTS

DE 20311169 U1 11/2003

(Continued)

*Primary Examiner*—Jacob Y Choi

(57) ABSTRACT

The invention describes an LED lighting module (1) comprising an LED element (10), an electronic driving arrangement (30) for driving the LED (11), and a heat sink (20). The heat sink (20) forms a casing for the electronic driving arrangement (30) and comprises a receptacle interface (26) on a front side (F) of the heat sink (20) with a number of first reference elements (27) for coupling the LED element (10) to the heat sink (20) in a defined orientation. The heat sink further comprises a cavity (28) for enclosing at least parts of the electronic driving arrangement (30) and a number of second reference elements (22) for coupling the LED light module (10) to a secondary optic (70,70'). Moreover the invention describes a lighting assembly (80, 80') comprising such an LED lighting module (1).

7 Claims, 4 Drawing Sheets

FOREIGN PATENT DOCUMENTS

| | | | | |
|---|---|---|---|---|
| DE | 102004062990 .0 | | * | 12/2004 |
| EP | 1353120 | A2 | | 10/2003 |
| EP | 1519105 | A2 | | 3/2005 |
| EP | 1594170 | A2 | | 11/2005 |
| WO | 0036336 | A1 | | 6/2000 |
| WO | 03048637 | A1 | | 6/2003 |
| WO | 03056237 | A1 | | 7/2003 |
| WO | 2006066531 | A1 | | 6/2006 |

* cited by examiner

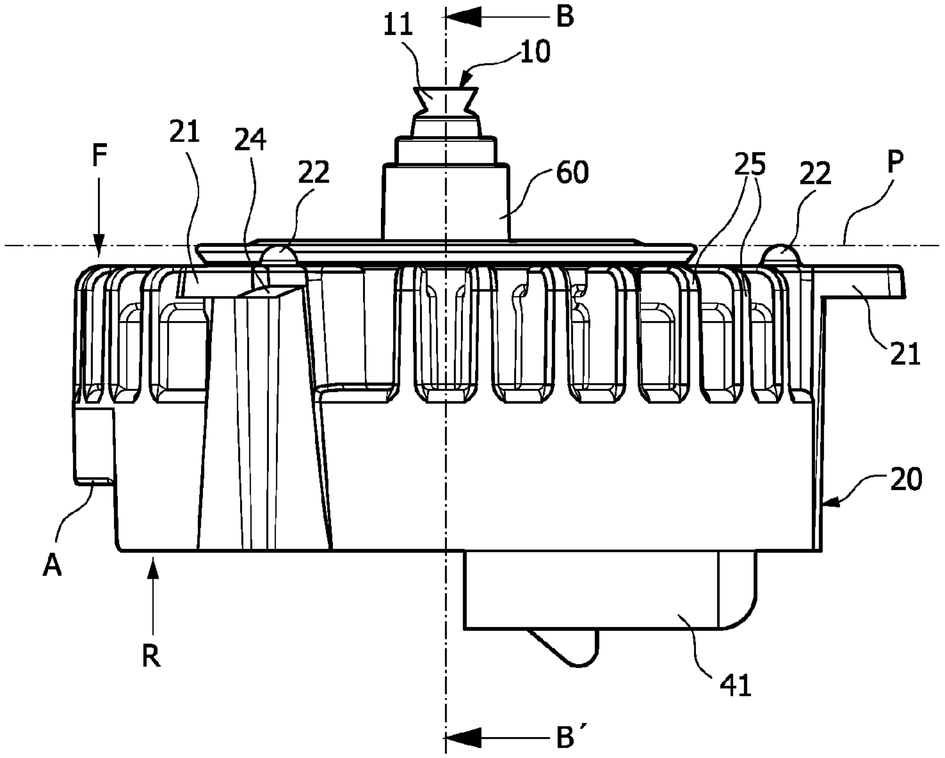
FIG. 3
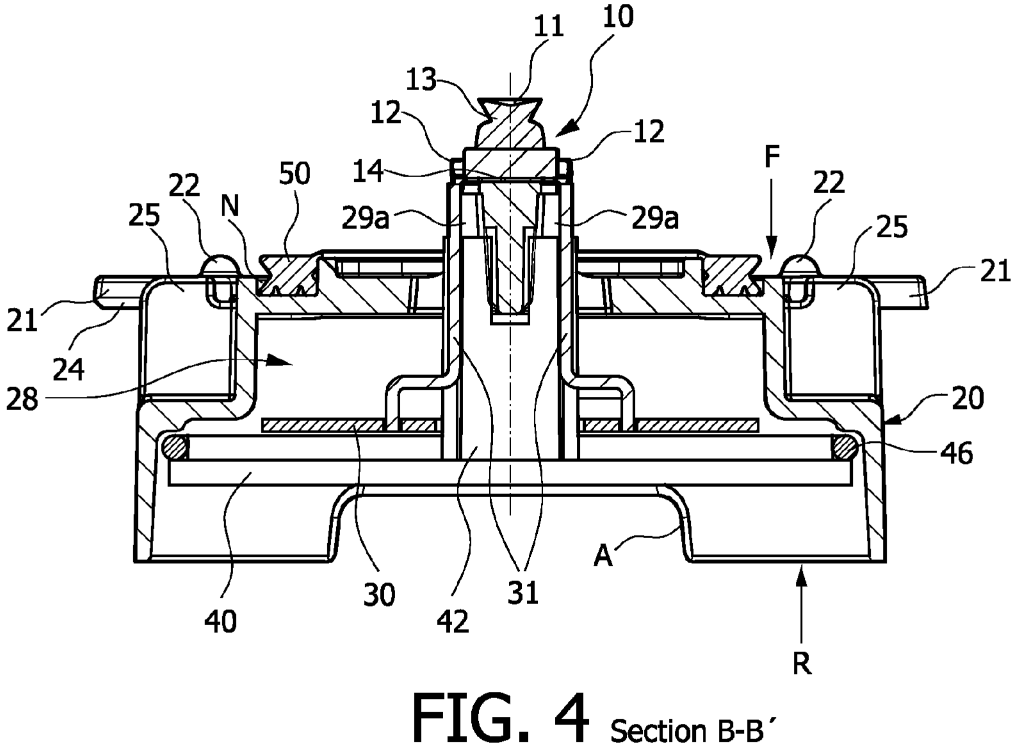
FIG. 4 Section B-B´

LED LIGHTING MODULE

This invention relates in general to an LED lighting module comprising an LED element, an electronic arrangement for driving the LED, and a heat sink. Furthermore, the invention relates to a lighting assembly comprising such an LED lighting module.

In recent years, interest in the use of LED light sources in place of traditional light sources has grown considerably due to well-known advantages of LED light sources when compared with traditional light sources. This applies particularly to the automobile industry, in which the traditional type of lamp used for automotive front and rear lighting devices will tend to be replaced by LED lighting modules. In particular for signalling functions, as in, for example, rear combination lamps (RCL) and in daytime running lights (DRL), it is expected that the traditional type of lamp will soon be replaced by LED lighting modules, since less light intensity is required for such signalling functions than in headlamps which must illuminate a greater area. However, even for signalling functions, considerable light intensity is required.

Estimations of the required light intensity and the necessary power to generate this light intensity indicate that the module dissipates about 3 to 5 Watt. Because of the required power, an LED device used in an automotive lighting application must be capable of operating at elevated ambient temperatures. For example, the maximum ambient temperature is approximately 85° C. for rear lighting applications and 105° C. for a front lighting application. On the other hand, the maximum junction temperature of LED devices is currently limited to 135° C. In addition, the light output of LEDs (in particular AlInGaP-based LED emitting in the red and amber spectral range) strongly decreases with increasing junction temperature. A further problem is that in order to achieve the required optical performance of an LED lighting module, in particular in complex shaped reflectors, light guides, TIR (total internal reflection) optics and the like, a precise positioning and referencing of the LED light source relative to the secondary optics is required. Due to these requirements, currently known LED lighting modules, for example as shown in EP 1353120 and U.S. Pat. No. 6,637,921, are rather complicated assemblies. As a consequence, the assembly during production process is complicated and expensive. In particular, connecting and positioning the LED to the electronic driver or to a connector by lead wires requires manual handling resulting in variations in quality of the final product. Another important consideration is that LED lighting modules, intended to replace the usual type of lamp, should not be more expensive to manufacture than those lamps.

Therefore, an object of the present invention is to provide an LED lighting module that is simple and economical to manufacture, and for which a correct positioning of the LED-element to a secondary optic is automatically achieved in assembly.

To this end, the present invention provides an LED lighting module comprising an LED element, an electronic arrangement for driving the LED, and a heat sink, which heat sink forms a casing for the electronic driving arrangement and comprises

- a receptacle on a front side of the heat sink with a number of first reference elements for coupling the LED element to the heat sink in a defined orientation,
- a cavity for enclosing at least parts of the electronic arrangement,
- a number of second reference elements for coupling the LED light module to a secondary optic of a lighting assembly, e.g. a signalling light.

The specially shaped heat sink according to the invention, with its receptacle and first reference elements, allows the LED element to be automatically mounted correctly on the heat sink. The dedicated shape of the receptacle allows the LED element to be connected to the electronic driving arrangement, and serves therefore as an interface between the LED element and the electronic driving arrangement. Therefore, in the following the receptacle is also referred to as "interface". The LED element can be a type of so-called "packaged LED", in which a light-emitting diode (LED) is attached to a small carrier element that is equipped with contacts for electrically connecting the LED, usually in the form of small metal legs or leads. Owing to the positioning of the electronic driving arrangement, or at least parts of the electronic driving arrangement, that are to be electrically connected to the LED, in the heat sink, a fixed orientation or positioning of the electronic driving arrangement with respect to the heat sink, and therefore also to the LED, is also automatically defined, allowing uncomplicated connection of the LED and electronic driving arrangement. Furthermore, by means of the second reference elements also integrated in the heat sink, the correct positioning of the LED lighting module, and therefore also of the LED element, within the secondary optic is also guaranteed. Also, placement of the electronic driving arrangement in the heat sink has the further advantage that the entire LED lighting module can be very compact, whilst the heat sink, preferably made of metal in one piece since it is the casing for the electronic driving arrangement, has a large surface area and that the generated heat can therefore very easily be dissipated. Because of the compact construction, the LED lighting module can easily be used in existing lighting assembles originally intended for use with the usual type of lamp such as halogen lamp or gas-discharge lamp. It is only necessary to ensure that the interface between the LED lighting module, in particular the second reference elements and maybe also any existing attaching means of the LED lighting module, are complementary to the existing light assembly in which the LED lighting module is to be used.

The dependent claims and the subsequent description disclose particularly advantageous embodiments and features of the invention.

In a particularly preferred embodiment of the invention, the LED lighting module comprises only a single LED element, which is particularly preferably placed centrally on the front side of the heat sink. However, it is conceivable that multiple LED elements are arranged, for example as a group, on the front side of the heat sink. In the following, without narrowing the scope of the invention in any way, reference is made to the single LED case.

In a particularly preferred embodiment of the invention, the LED element is mounted directly onto the heat sink. The term "directly" means that only a thermal conductive tape, thermal conductive glue or similar is used to mount the LED element onto the heat sink. This direct mounting of the LED element to the metallic heat sink ensures optimal thermal management of the total module.

The cavity for enclosing the electronic driving arrangement can be at any suitable location on the heat sink. Preferably however, the cavity is located on the rear side, opposite to the front side, of the heat sink. Such an arrangement allows a particularly straightforward assembly of the LED lighting module.

In a particularly preferred embodiment of the invention, the LED lighting module comprises a rear cover to cover the cavity enclosing the electronic driving arrangement. The cover is preferably of plastic, which can be, for example, economically injection-moulded. The rear cover is preferably rigidly mounted on the heat sink element. The rear plastic cover may be most preferably mounted on the heat sink by a combination of clamping and, for example a snap fastening, or mounted by hot stamping or a similar mounting technique in order to optimise the mechanical stability of the module.

Furthermore, the rear cover is preferably sealed to the heat sink element by a sealing ring. In this way, the cavity, which encloses the electronic driving arrangement, is effectively protected from contamination by loose particles and from the intrusion of moisture.

In order to optimise even further the assembly process, the electronic driving arrangement is preferably attached to the rear cover. For example, the electronic components of the electronic driving arrangement may be mounted on a printed circuit board (PCB) which is, in turn, attached to the rear cover.

Advantageously, the rear cover comprises a connector for electrically connecting the LED lighting module to a power supply, e.g. an on-board power supply network of a car. This has the advantage that the LED lighting module need not be fitted with external leads or suchlike, which might easily be damaged during assembly.

In a particularly preferred embodiment of the invention, the LED-Element is electrically connected with the electronic driving arrangement by lead elements protruding from the cavity through the heat sink wall to the front side of the heat sink. These might be, for example, rod-shaped lead elements.

In a preferred variation of this embodiment, the rear cover comprises rigid contact elements for electrically connecting the electronic arrangement with the LED-Element. In this variation, when assembling the LED module, the lead elements of the electronic driving arrangement are automatically electrically contacted by means of these rigid contact elements, to the contact leads of the LED element.

In a further preferred variation, the rear cover comprises at least one rigid support element which mechanically supports lead elements between the LED element and the electronic driving arrangement when the rear cover is assembled with the heat sink. In this way, the normally relatively weak lead elements and the LED connecting elements are mechanically relaxed and not stressed during temperature cycling and vibration stress. Here also, the rigid support element is arranged to that, when mounting the heat sink element to the rear cover, the lead elements, which may for example be relatively weak or flexible rod-shaped elements which are already soldered to the PCB of the electronic driving arrangement and protrude upwards to the heat sink, are automatically supported.

As already described above, the connection between the heat sink and the rear plastic cover should be completely rigid and stable, in order to ensure a high level of mechanical stability of the entire module.

The first and second reference elements can be realised in different ways, depending on the manner of construction of the LED element or the secondary optic and its interface to the LED lighting module.

Since LED elements, as described above, usually comprise a base with two legs for contacts, one on each side and pointing downwards from the LED, it is opportune to realise the first reference elements preferably in the form of notches of suitable dimensions on the interface between the LED element and the heat sink. The contact legs or leads of the LED lighting module can slide into these slits, so that minimal tolerances in connecting the LED to the heat sink can be met in an uncomplicated manner.

Preferably, the second reference elements comprise at least three reference protrusions, for example raised points or suchlike, positioned in a reference plane parallel to the front side or on a front plane of the heat sink. More preferably, exactly three protrusions are realised, which define exactly the reference plane.

The heat sink preferably also comprises mounting elements for mounting the LED lighting module to the secondary optics, for example, to a reflector housing of the lighting assembly. These mounting elements may be bayonet mounting elements, or elements that allow the LED lighting module to be screwed onto the secondary optic, etc.

The LED lighting module according to the invention can be utilised in basically any lighting assemblies. The lighting assembly according to the invention, comprising a LED lighting module according to the invention, is preferably an automotive front lighting assembly, in particular a daytime running light or an automotive rear lighting assembly, and particularly at least part of a rear combination lamp. In other words, this LED lighting module is preferably utilised for signalling purposes.

In the case of the preferred variant described above, in which the second reference elements comprise at least three reference protrusions, the lighting assembly according to the invention preferably comprises grooves corresponding to the second reference elements of the LED lighting module for referencing the LED lighting module in the reference plane.

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the drawings, like references denote the same elements throughout:

FIG. 3 shows a lateral view of the LED lighting module of FIG. 1;

FIG. 4 shows a cross-section of the LED lighting module of FIG. 3 along the axis B-B';

Figure 5:
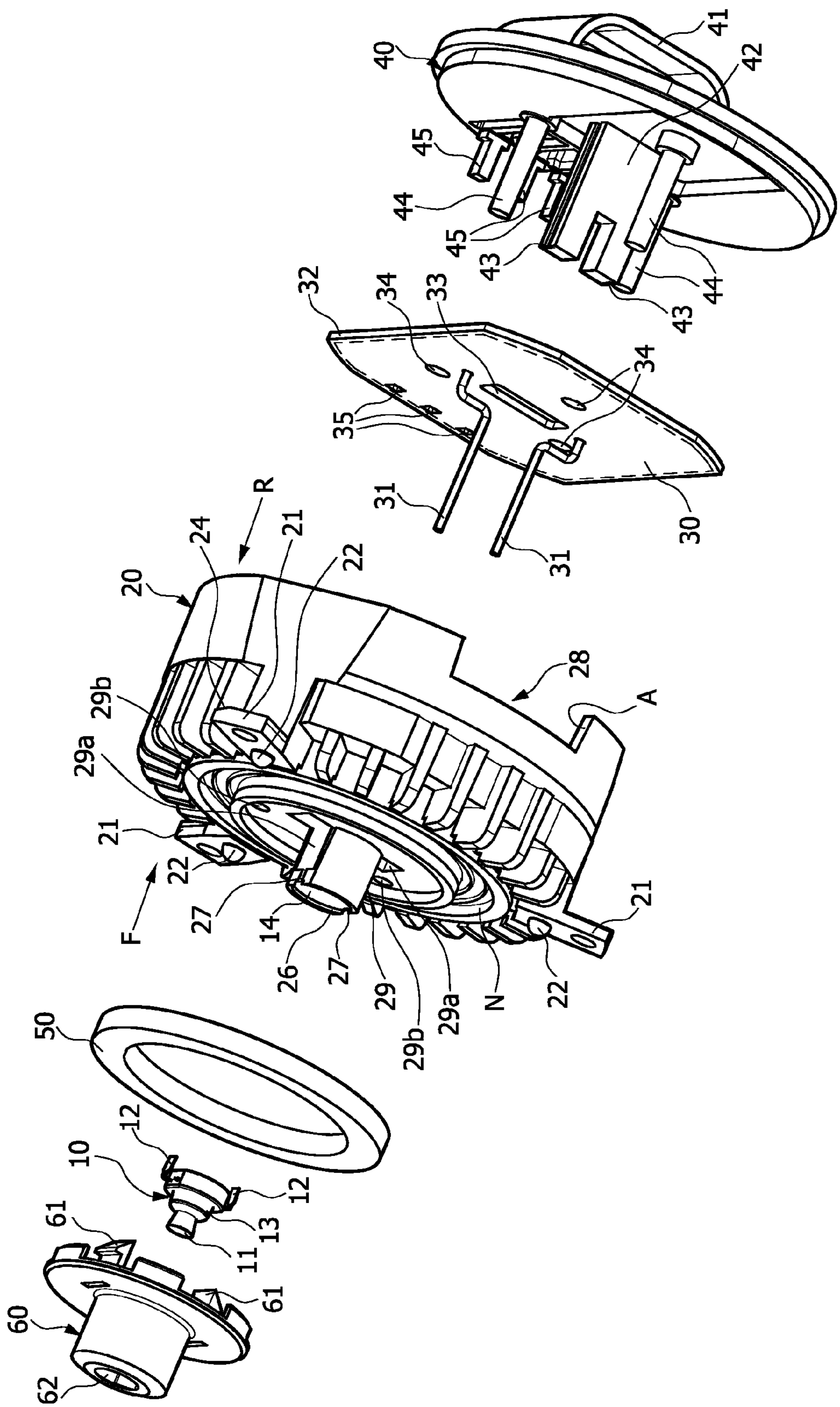
FIG. 5 shows an exploded view of the LED lighting module of FIGS. 1 to 4.
Figure 6A:
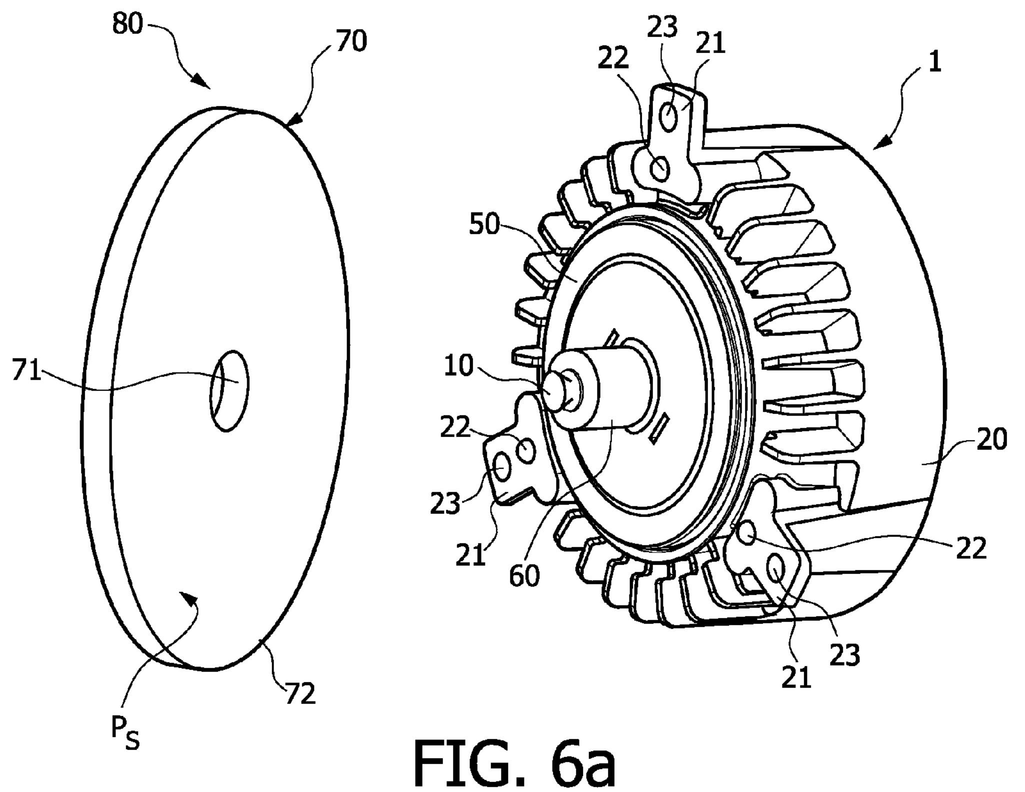
Figure 6B:
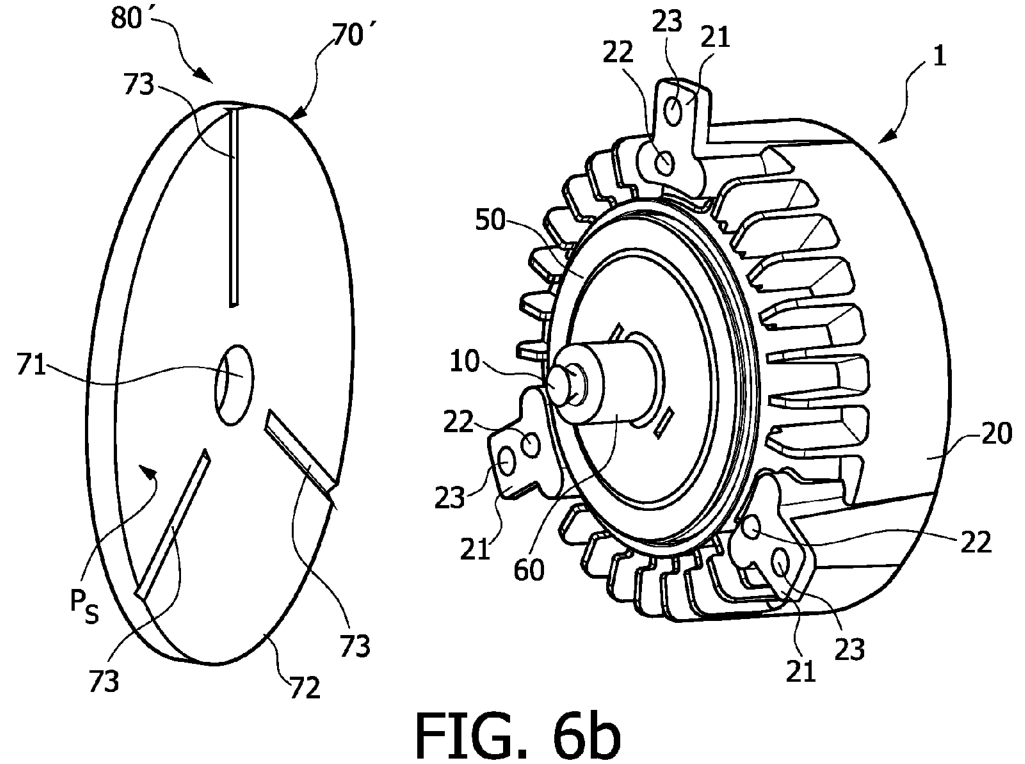

FIG. 6*a* shows a schematic representation for the positioning of an LED lighting module of FIGS. 1 to 5 with a schematically represented secondary optic according to a first embodiment of the invention;

FIG. 6*b* shows a schematic representation for the positioning of an LED lighting module of FIGS. 1 to 5 with a schematically represented secondary optic according to a second embodiment of the invention.

The dimensions of the objects in the figures have been chosen for the sake of clarity and do not necessarily reflect the actual absolute or relative dimensions.

FIGS. 1 to 5 show various views and assembly stages of a particularly preferred embodiment of an LED lighting module pursuant to the invention. A central component of this LED lighting module 1 is the heat sink 20, which, on a front side F, proffers an interface 26 (receptacle) for an LED element 10, and which comprises a large cavity 28 on a rear side, in which the electronic driving arrangement 30, referred to in the following as "driver" or "driver electronics", is enclosed. The cavity 28 with enclosed driver 30 is sealed with a plastic rear cover 40, which not only ensures that the driver 30 in the cavity 28 is protected from dirt and moisture, but which also—as described below—provides stability for the entire LED lighting module 1.

Here, the driver electronic 30 is mounted on a PCB 32, as indicated in FIG. 5. This PCB 32 is mounted to the inside of the plastic rear cover 40. To facilitate this, the PCB 32 features a rectangular opening 33 and three holes 34, arranged to complement a central rigid support element 42 of the rear cover 40, which, in the assembled state, protrudes through the central rectangular opening 33 of the PCB 32; and three centring pins 44 of the rear cover 40, which, in the assembled state, protrude through the holes 34 of the PCB 32. With the aid of the centring pins 44 and the central rigid support element 42 on the one hand, and the corresponding holes 34 and the central opening 33 on the other hand, a unique orientation of the PCB 32 to the plastic rear cover 40 can be ensured.

A connector 41 in the form of a plug 41, integrated in the outer side of the plastic rear cover 40, serves to connect the LED lighting module 1 with the on-board electronics of an automobile. The connection from the contacts (not shown in the diagram) arranged in the plug 41 to the driver electronic 30 is made via contact pins 45, which are inserted into contact holes 35 drilled at the corresponding positions on the PCB 32, when the PCB 32 is mounted, with the aid of the centring pins 44 and the central rigid support element 42, in the corresponding position on the inside of the plastic rear cover 40. In addition, the contact pins 45 can be soldered to the driver electronic 30 at the contact holes 35.

Two contact leads 31 extend upward from the front side of the PCB 32, which, in its assembled state inside the heat sink 20, faces in the same direction as the front side of the heat sink 20. The contact leads 31 are formed in such a way that, when the PCB 32 is mounted on the inside of the plastic rear cover 40, these leads 31 reach the LED element 10 by grooves 43 in the rigid support element 42, and are thereby supported or braced by the rigid support element 42.

After mounting the PCB 32 and soldering to the contact pins 45, the plastic rear cover 40 can be inserted into the cavity 28 in the rear side of the heat sink 20. For this purpose, corresponding holes are found on the front side F of the heat sink 20 into which the centring pins 44 can be inserted. The heat sink 20 is made of metal, preferably manufactured as a die cast piece.

The interface 26 for the LED element 20 is located centrally on the front side F. The interface 26 comprises a cylinder 29 protruding centrally outwards from the front side F of the heat sink 20, with notches 27 on the outer edge as first reference elements, into which the contact leads 12 of the LED element can fit. The LED element 10 is a so-called packaged LED, in which the actual LED 11 is attached to a carrier 13, onto which in turn the contact leads 12 are attached, for connecting the LED 11 to a driving electronic.

On the cylinder 29 and below the notches 27, slits 29*a* travel all the way into the front face of the heat sink. The uppermost surfaces of the central rigid support element 42 of the plastic rear cover 40 protrude through these slits 29*a* when the plastic rear cover 40 is attached to the heat sink 20. The contact wires 31 positioned in the grooves 43 of the central rigid support element 42 are then automatically correctly placed with respect to the contact leads 12 of an LED element 10 positioned with the aid of the notches 27 in the interface 26.

As can be seen particularly in FIG. 4, the cylinder 29 is hollow at its upper end, down to about the level of the notches 27, and offers therefore a recess into which the LED element 10 can fit. Below the notches 27, the cylinder 29 is solid, whereby the surface facing outwards, and being the base of the hollow part of the cylinder 29, is the contact surface 14 for the LED element 10. The underneath of the LED element 10 is attached by means of thermal conductive glue to this surface 14, so that heat generated during operation is conducted thoroughly and quickly to the heat sink 20. The contact leads 12 of the LED element 10 are at the same time fitted snugly in the notches 27 in the upper region of the cylinder 29. The internal diameter of the hollow part of the cylinder 29 should match as closely as possible the outer diameter of the carrier 13 of the LED element 10, i.e. the cylinder 29 also serves as a first reference element in exactly positioning the LED element 10 in the heat sink 20. As can also be seen in FIG. 4, the slits 29*a* for insertion of the central rigid support element 42 extend into the solid part of the cylinder 29. The slits 29*a* are realised to match as closely as possible the central rigid support element 42, so that as little material as possible is removed from the cylinder 29, ensuring a low thermal resistance between the surface 14 to which the LED element 10 is attached, and the rest of the heat sink 20.

Generating an electrical contact between the LED element 10 and the driver 30, after mounting the rear cover 40 to the heat sink 20, can easily be done in an automated manner by soldering the contact leads 12 with the ends of the contact wires 31. This electrical contact no longer has to be made manually. When mounting the plastic rear cover 40 and the heat sink 20, the centring pins 44, together with the openings 29*b* in the front side F of the heat sink 20, ensure a correct and tight-fitting placement. The upper ends of the contact wires 31 from the PCB 32 and their contact to the contact leads 12 of the LED element 10 can best be seen in the cross-section through the LED lighting module shown in FIG. 4 and FIG. 2. The ends of the centring pins 44, protruding through the openings 29*b*, can also be seen in FIG. 2.

As can be seen in FIG. 4, the plastic rear cover 40, is set quite deeply, when assembled, into the cavity 28 of the heat sink 20, and isolated from the heat sink 20 by means of an O-ring 46, so that moisture and dirt are prevented from penetrating into the heat sink 20. In order to easily insert a plug coming from the on-board supply into the socket 41 of the plastic rear cover 40, a cut-out A is foreseen at the corresponding location on the underside ring of the heat sink 20 (cf. FIGS. 3, 4, and 5).

Thermal dissipation is achieved mainly by numerous cooling fins 25, directed radially outwards on the forward region (adjoining the front side F) of the heat sink 20. If more cooling is required, the heat sink 20 can easily be equipped with additional heat sink elements, for instance on the back of the heat sink 20. Equally, it is possible to make the heat sink element overall bigger, so that the cooling fins are not only confined to the frontal regions, but extend axially along the entire length of the heat sink. The cavity for insertion of the driver would then only be in the central region of the rear side of the heat sink.

As already described above, connection of the plastic rear cover 40 with the heat sink is achieved by a clamping, snap fit or hot stamp joining technique, or similar joining methods which ensure a very stable and lasting connection between the plastic rear cover 40 and the heat sink 20.

On the front face F of the heat sink 20, three connecting tabs 21 are arranged to face radially outward. These connecting tabs 21 serve to position and mount the entire LED lighting module 1 to the secondary optic of a lighting assembly. To ensure correct positioning, a raised nub or stud 22 is found on each connecting tab 21, to act as second reference element 22 or reference points 22. A reference plane P, parallel to a front plane of the LED lighting module 1, is defined with the aid of these three studs 22. The interaction of these reference points 22 with the secondary optic is illustrated with the aid of FIG. 6*a*.

Furthermore, a connecting hole 22 is to be found in each of the connecting tabs 21, by means of which the LED lighting module 1 can be attached or fastened to the lighting assembly or secondary optic, e.g. a reflector in which the LED lighting module 1 is inserted. In another assembly variation, the undersides of the connecting tabs 21 feature a slanted edge 24, so that the LED lighting module 1 can also be fastened in the manner of a bayonet fastening by screwing the LED lighting module in a clock-wise direction into complementary openings of the lighting assembly. The particular form of the connecting tabs 21 allows the LED lighting module to be used in lighting assemblies having different modes of attachment, and can of course also be used in lighting assembles featuring both kinds of attachment mode, i.e. both bayonet and connecting holes 23.

As can be seen particularly in FIGS. 4 and 5, the LED lighting module 1 also comprises a gasket 50, which lies in a groove N on the front side F of the heat sink 20. This gasket 50 ensures that the LED lighting module 1 can be fastened tightly and sealed to the lighting assembly, for example, when the LED lighting module is attached to the rear side of a reflector casing of a lighting assembly, the LED element protrudes through an opening in the reflector casing.

Furthermore, the interface 26 together with the contact leads 12 of the LED element 10 and the contact wires 31 protruding through the heat sink from behind, are protected in the assembled state by a protective cap 60 with a central opening 62, through which the front side of the LED element 10 protrudes. This protective cap 60 is placed from above on the otherwise finished LED lighting module 1, and fastened by means of snap-fit hooks 61 in the slits 29*a* on the front side F of the heat sink 20. The protective cap 60 preferably has a reflective outer surface, so that it does not absorb light given off from the LED 11 and reflected by the reflector, when the LED lighting module 1 protrudes from behind through an opening in the reflector casing.

Figure 1:
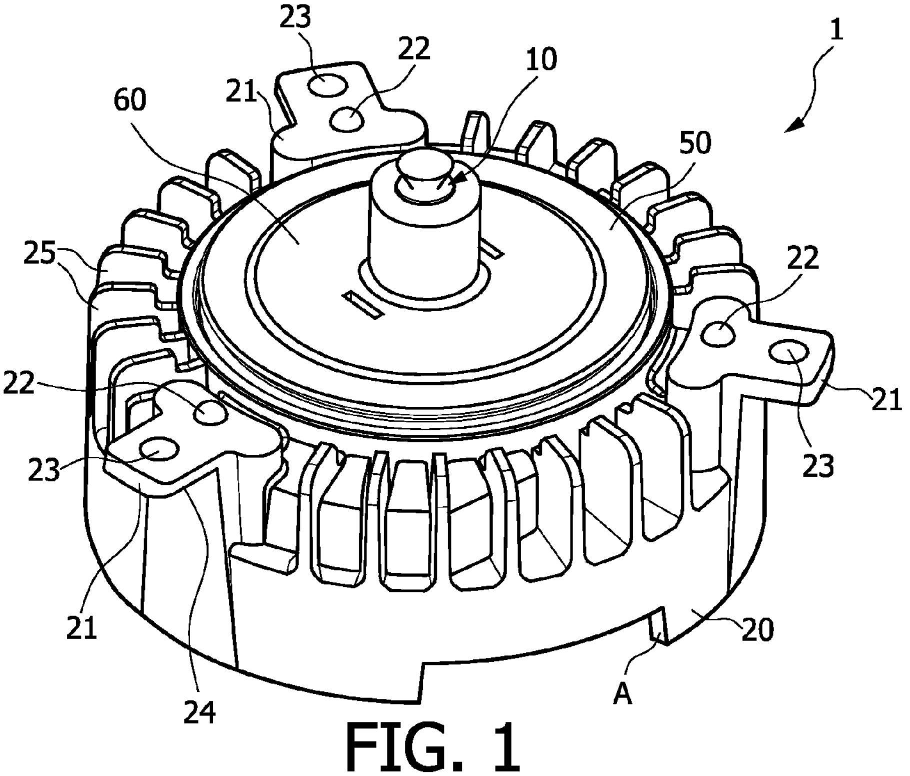
FIG. 1 shows a perspective view of an embodiment of an LED lighting module according to the invention.
Figure 2:
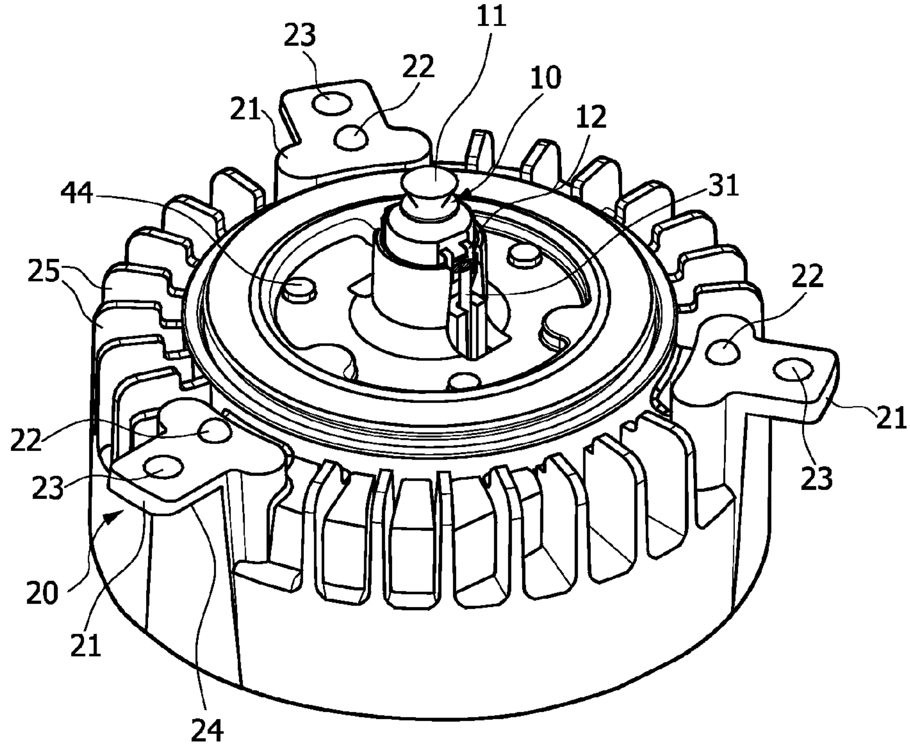
FIG. 2 shows a further perspective view of the LED lighting module of FIG. 1, from which the upper protective cap has been removed.

A plan view of the completely assembled LED lighting module 1 including the protective cap 60 and the gasket 50 is shown in FIG. 1.

FIGS. 6*a* and 6*b* are only intended to show in a schematic manner the positioning of the LED lighting module 1 according to the invention relative to a secondary optic 70, 70' of a lighting assembly 80, 80'. The secondary optic 70, 70' is simply shown as a flat disc with a central opening 71. In practice, this is an inlet 71 on the rear side of a reflector casing of the corresponding lamp.

According to FIG. 6*a*, a correct positioning in the direction of insertion (the direction in which the front part of the LED lighting module 1 is inserted into the inlet opening 71 of the secondary optic 70), is achieved with the help of the reference points or studs 22, in that these three reference points 22 touch the lighting assembly on a reference plane $P_S$ of the secondary optic 70, which reference plane $P_S$ corresponds to the surface 72 of the secondary optic 70 that faces the LED lighting module 1.

Positioning within the reference plane $P_S$, i.e. in the x and y directions, is achieved here by having the upper cylinder of the protective cap 60, which serves to shield the interface 26 of the heat sink 20 and the connection between LED element 10 and contact wires 31, exactly match the inlet opening 71 of the secondary optic 70.

FIG. 6*b* shows a preferred variation of a lighting assembly 80', in which such an exact matching of protective cap 60 and inlet opening 71 of the secondary optic 70' is not required. Here, referencing within the reference plane $P_S$ is achieved the aid of three grooves 73 travelling radially outwards in the reference plane 72, in which can lie the correspondingly positioned reference studs 22 on the connecting tabs 21 of the heat sink 20. In this way, a correct positioning of the LED lighting module 1 to the secondary optic 70' is easily ensured.

According to the invention, a high-quality product with low failure rate is realised with a view towards automated industrial production. The assembly of the total LED lighting module is possible by sequential stacking of the individual parts above each other. Manual assembly is not required.

Although the present invention has been disclosed in the form of preferred embodiments and variations thereon, it will be understood that numerous additional modifications and variations could be made thereto without departing from the scope of the invention. Even though the LED lighting module is particularly suitable for use in automotive applications, it can be used for LED light sources for any lighting application, for example shop lighting purposes, various signalling purposes, etc.

For the sake of clarity, it is also to be understood that the use of "a" or "an" throughout this application does not exclude a plurality, and "comprising" does not exclude other steps or elements.

The invention claimed is:

1. An LED lighting module sealingly enclosing an LED device driver, comprising:

an LED mounted on a top wall of an annular heat sink, said heat sink including a depending side wall with a plurality of cooling fins, said cooling fins in thermal contact with said LED;

a recessed cavity formed by said depending sidewall of said annular heat sink;

wherein said recessed cavity receives an LED driver PCB, said LED driver PCB in electrical contact with said LED;

a rear cover enclosing said LED driver PCB within said recess;

wherein said electrical contact between said LED and said LED driver PCB is through contact leads extending from said LED driver PCB through positioning notches on an interface of said heat sink;

said contact leads retained by grooves in a rigid support element extending from said rear cover, through said LED driver PCB and aligned with said notches in said interface, said LED having contact leads extending from said interface to said LED driver PCB contact leads.

2. The LED lighting module of claim 1:

wherein the heat sink has a number of first reference elements for coupling the LED element to the heat sink in a defined orientation, wherein said rear cover is sealingly mounting to said heat sink about said recess cavity to enclose said PCB, said PCB including an electronic driving arrangement, a plurality of second reference elements positioned peripherally around said LED coupling the LED light module to a secondary optic.

3. An LED lighting module according to claim 2, where the electronic driving arrangement is attached to the rear cover.

4. An LED lighting module according to claim 2, where the rear cover is rigidly joined to the heat sink element.

5. An LED lighting module according to claim 2, where the rear cover comprises a connector for electrically connecting the LED light module to a power supply.

6. An LED lighting module according to claim 2, where the LED element is electrically connected with the electronic driving arrangement by said contact leads protruding through the heat sink to the front side of the heat sink.

7. An LED lighting module according to claim 2, wherein the rear cover comprises said rigid support elements for electrically connecting the electronic driving arrangement with the LED element or rigid support elements, which mechanically support lead elements between the LED contact leads and the electronic driving arrangement, when the rear cover is assembled with the heat sink.

* * * * *